United States Patent Office 3,354,239
Patented Nov. 21, 1967

3,354,239
POLYOLEFIN BLEND
Glen A. Short, Cherry Hill, N.J., assignor to Shell Oil Company, New York, N.Y., a corporation of Delaware
No Drawing. Filed Feb. 8, 1967, Ser. No. 614,556
4 Claims. (Cl. 260—876)

ABSTRACT OF THE DISCLOSURE

Modified compositions of isotactic polypropylene having improved low-temperature impact resistance while retaining high tensile strength are produced by intimately blending isotactic polypropylene with from about 10 to about 90% by weight of certain polypropylene block polymers having ethylene-propylene blocks attached to one end of at least a portion of the polypropylene chains.

---

This application is a continuation-in-part of copending application Ser. No. 183,012, filed Mar. 28, 1962, now abandoned.

This invention relates to an improved polypropylene product and to a method for improving the low-temperature impact resistance of polypropylene.

Polypropylene is a thermoplastic polymer which has recently achieved commercial importance. It is produced by polymerizing polypropylene at temperatures ranging from about 20° to about 150° C. and pressures below about 500 p.s.i.g. The catalysts used in the polymerization are generally designated low-pressure polymerization catalysts. Broadly, they are formed from a transition metal halide and a metal organic compound. By careful selection of catalyst and operating conditions, it is possible to produce stereospecific polymers, particularly polypropylene characterized by a high proportion of isotactic content. The present invention is concerned with production of an improved blend of isotactic polypropylene with an ethylene-modified polypropylene product.

It is difficult, if not impossible, to polymerize propylene to a polymer which has 100% isotactic structure. However, it is possible to produce, with commercially practical catalysts, polymers which have a high proportion of segments which are completely isotactic. Properties which are associated with high isotacticity of polypropylene are a high degree of crystallinity or crystallizability and a high proportion of material which is not soluble in hydrocarbon solvents at room temperature or moderately elevated temperatuers. Highly isotactic polypropylene has the desirable characteristics of having a high tensile strength and substantial hardness. All these properties decrease with decreasing isotactic content. A disadvantage of polypropylene in commercial ranges of isotacticity is its brittleness and low impact resistance at relatively low-temperatures, such as 0° C. and below. This severely handicaps the applicability of highly isotactic polypropylene to uses such as vessels or containers which during use may be subject to mechanical shock, particularly at low ambient temperatures. The impact resistance at 20° C. and above is moderately good for polypropylene of moderately high isotactivity, but decreases with increasing crystallinity.

The properties of polypropylene are also affected by its molecular weight. The intrinsic viscosity (I.V.), measured in Decalin at 150° C. and expressed in dl./g., is usually employed as an indication of molecular weight of polypropylene. The intrinsic viscosity of isotactic polypropylene can range from 0.3 or less to 20 or more. The intrinsic viscosity of general purpose grades of polypropylene is generally between 2 and 3.5. Injection grades, i.e., those which are to be fabricated into articles by injection molding, desirably have an intrinsic viscosity in the range from 1.8 to above 3. For the production of pipe, intrinsic viscosities in the order of 5 are satisfactory.

The impact resistance of polypropylene is suitably tested by ASTM Standard Method D256–56 for impact resistance of plastics, using the Izod type test (Method A). The test measures the energy expended by a pendulum in breaking with one blow a standard notched test strip. The results are reported as foot pounds per inch of notch, which is commonly shortened to "foot pounds per inch" and abbreviated "ft. lb./in." To measure the impact resistance at 0° C., as used in this specification, the test specimen is conditioned for at least four hours in an ice-water slush and is placed on the impact machine and tested within 30 seconds, preferably within 10 seconds after removal from the cold bath.

Low temperature impact resistance of polypropylene of fixed isotacticity increases with increasing intrinsic viscosity. Hence, polymer of moderately good-low-temperature impact resistance, even at very high isotacticity, can be produced if one is willing to go to a high enough I.V. However, propylene homopolymer of high I.V. presents difficulties in fabricating processes and is therefore in many instances not commercially acceptable or competitive.

The problem which led to this invention was the need for a polypropylene product which retains a substantial part of the high tensile strength associated with high isotacticity and which nevertheless has an unusually high impact resistance at low temperatures and also has a molecular weight in the commercially desired range.

It is an object of this invention to provide polypropylene blends characterized by improved low temperature impact resistance and retention of satisfactory tensile strength, particularly at intrinsic viscosities in the range from 1.5 to 6 dl./g. It is further object to provide a novel product comprising a blend of isotactic polypropylene with a modified, specially structured polymer of propylene and ethylene. It is a further object to provide a method for producing a polypropylene product having the above mentioned properties. Other objects will appear from the following description of the invention.

Although solid polyolefins have been known for only a few years there have already been suggested a bewildering variety of blends of various plastics and elastomeric materials with various polyolefins to achieve a variety of purposes. It has now been found in a study directed to improving the low temperature impact resistance of polypropylene that blending of many different materials into polypropylene has substantially no effect or an adverse effect on low temperature impact resistance while blending of others provides more or less improvement. Materials which are ineffective or of substantially no effectiveness in improving low temperature impact strength are lubricants such as petroleum waxes, oils, stearic acid, alkyl stearate and the like, and thermoplastic materials such as amorphous polypropylene, isotactic polymers of monoolefins of four or more carbon atoms and various other thermoplastics. Elastomers, some of which have been disclosed as suitable for admixture with polyolefins in the prior art, vary greatly in effectiveness. Among the elastomers disclosed in the prior art as suitable for blending with polypropylene to improve its impact resistance are copolymers of ethylene and propylene, containing from 20 to 97% ethylene.

In my application Ser. No. 183,145, now U.S. Patent No. 3,301,920, which is a continuation-in-part of U.S. Ser. No. 77,776, now abandoned, I have disclosed specially structured polypropylene products of good mechanical properties and strikingly superior low-temperature impact resistance, consisting essentially of polypropylene chains at least some of which have attached to one end thereof a portion of an ethylene-propylene copolymer chain.

According to the present invention, a product having excellent impact strength at low temperatures, as well as other desirable mechanical properties, can be produced by blending conventional isotactic polypropylene with modified, specially structured polypropylene such as the products of said patent having a sufficiently high total ethylene content so that the ethylene content of the final blended product of this invention is in the range from 1 to about 22% by weight. For purposes of blending with isotactic polypropylene to produce the polymer blends of this invention, the specially structured polypropylene product has an ethylene content in the range from 2 to about 25% by weight, suitably between 2 and 20%, and comprises as an essential component isotactic polypropylene chains having ethylene-propylene copolymer attached to one end of at least a portion of the chains; said isotactic polypropylene chains comprise at least 50% by weight of said specially structured polypropylene product.

The weight ratio of said specially structured polypropylene product to said isotactic polypropylene blending stock is suitably between 0.1:1 and 10:1, corresponding roughly to from about 10% to about 90% by weight of specially structured product in the total blend. While ratios of 0.25:1 to 1:1 are in many instances suitable it is also often of advantage to employ lower or higher ratios within the above-stated broader range.

The physical properties of the products of this invention are a function of the interplay of several factors.

The proportion of the blend which consist of stereoregular polypropylene chains is important to preservation of the desirable tensile strength. This proportion will be at least about 55% by weight of the total blend and comprises the homopolymer blending stock and the homopolymer chain portions of the added modified polypropylene product.

The improvement in impact properties is a function of the ethylene-to-propylene ratio of the copolymer fraction, of the proportion of the copolymer fraction in the total product, and of the manner in which the copolymer fraction is structurally integrated into the total product.

The copolymer fraction present in said modified product has a content of ethylene units between 10% and 90% by weight. If the copolymer segments have relatively high ethylene contents, between 40 and 80% by weight, the modified product is capable of imparting good impact properties to the blend due to its copolymer content while permititng the blend to retain good tensile properties due to the fact that the ethylene-containing copolymer segments are a relatively small part of the product and the remainder has the good tensile properties of isotactic polypropylene. The ethylene units are preferably present in the copolymer segment in substantially uniform distribution. This does not necessarily require statistical randomness but does mean that the ethylene-to-propylene ratio does not vary systematically from one end to the other of the copolymer segment.

The blends of this invention are superior in impact resistance at low temperatures to blends produced from isotactic polypropylene and conventional rubbery ethylene-propylene copolymer when products are compared which have corresponding ethylene contents and ethylene-propylene relationship in the copolymer portion.

Compared with the corresponding specially structured products of said patent on a basis of equal content of ethylene units and copolymer, the products of this invention tend to have somewhat lower values of the mechanical properties associated with crystallinity, such as tensile strength. The decision whether to produce a blend according to this invention or a product according to the patent for use without blending will be based on each case primarily on commercial considerations such as: the needed product qualities, availability of manufacturing equipment; and the relative economics, in any given case, of separately producing relatively smaller amounts of the structured polymer having a relatively large ethylene content and larger amounts of isotactic polypropylene for blending according to this invention, or producing as a single final product larger amounts of structured polymer with relative lower ethylene content. It is an advantage of this invention that commercial production of polypropylene products of high impact strength having a wide range of properties is simplified by producing only one or a few grades of ethylene-modified polypropylene products and blending these with appropriate amounts of homopolymer.

The production of isotactic polypropylene and of the specially structured polypropylene product can be suitably carried out by contact with highly stereospecific catalyst systems at reaction conditions which lead to the production of polypropylene of very high isotacticity. A great variety of stereospecific catalysts have been described in the literature. Known effective catalysts are species or modifications of the so-called Ziegler catalyst; that catalyst consists, broadly, of two-component systems comprising a compound of the left hand subgroups of Groups IV–VI or Group VIII of the Mendeleev Periodic Table, as illustrated on page 28 of Ephraim, "Inorganic Chemistry," 6th English edition, and a Group I–III element or alloy or hydride or organic derivative having an organometallic bond. Suitable catalysts can be selected from the references listed on pages 350 to 361 of "Linear and Stereoregular Addition Polymers" by Gaylord and Mark, Interscience Publishers, Inc., New York, 1959.

The most effective catalysts for the production of isotactic polypropylene known to date are those comprising certain forms of titanium trichloride and certain aluminum alkyls and aluminum alkyl halides. The titanium trichloride used in such catalysts may be the result of reduction of titanium tetrachloride during the course of catalyst preparation. In the preparation of particularly highly stereospecific catalysts, titanium trichloride is prepared by reducing titanium tetrachloride by contact with aluminum triethyl or another aluminum trialkyl and thereafter using the total reaction product of this first reaction step with sufficient aluminum triethyl or aluminum diethyl chloride or bromide to give a total aluminum to titanium mole ratio of at least 1:1. Preferred aluminum to titanium mole ratios are in the range from 2:1 to 3:1, but ratios up to 4:1 or 5:1 are sometimes used, and still higher ratios may be used, if desired. These preferred catalysts, as well as other useful catalysts, are described in more detail in Patents 2,971,925 and 3,147,238, both to Winkler et al.

The conditions under which polymerization takes place are conventional for the polymerization of propylene. The pressure is generally between atmospheric and 500 p.s.i. and the temperature in the range from 0° to 120° C., and preferably from 25° to 70° C. The reaction is generally carried out in a solvent medium in liquid phase. The medium may be any hydrocarbon or mixture of hydrocarbons which is liquid at the reaction conditions, from propane up to paraffinic fractions in the kerosene boiling range.

Compounds which modify the action of the catalyst may be present in the reaction mixture. For example, hydrogen, or zinc diethyl or other zinc alkyl may be added to limit the molecular weight of the polymer. Compounds which tend to increase the crystallinity of the polymer or other additives which are known to produce desired effects may be added.

Polypropylene suitable for use as blending stock in this invention is highly isotactic. Properties of isotactic polypropylene are described in detail in "Polypropylene" by Kresser, Reinhold Publishing Corp., New York, 1960. This invention is particularly useful in modifying polypropylene having a crystallinity, determined by X-ray or equivalent means, of at least about 60%. The following table illustrates typical properties of injection grade polypropylene.

TABLE 1

| | |
|---|---|
| Intrinsic viscosity | 2–3.6 |
| Izod impact, ft.lb./in. at 23° C. | 0.7–1.3 |
| Izod impact, ft.lb./in. at 0° C. | 0.30–0.40 |
| Tensile properties at 0.2 in./min.: | |
| Yield stress, p.s.i. | 4000–4800 |
| Modulus, p.s.i. $\times 10^{-5}$ | 1–1.6 |
| Insolubles in boiling isooctane, percent wt. | $\geq$95 |
| Crystallinity, percent | 65–70 |

In a preferred mode of preparing modified specially structured polypropylene product for use according to this invention, propylene is first polymerized with a suitable catalyst under conditions suitable for stereospecific polymerization. The catalysts and conditions used are the same as are referred to hereinabove for the production of isotactic polypropylene itself. The polymerization is carried on until a desired proportion of the desired total propylene conversion, e.g., from about 50 to about 90 percent of the desired propylene conversion, has been obtained. The desired total conversion is usually a function of the maximum concentration of solid polypropylene particles in the reaction mixture which can be handled in a practical manner. A suitable range of final polymer concentration is from 5 to 30% by weight or higher based on the reaction mass, depending on the processability characteristics of the slurry. After the desired proportion of total propylene conversion has been attained, ethylene is added to the reaction mixture in controlled proportion relative to propylene and the reaction is continued until the desired total conversion has been attained. At that time the reaction is stopped and the product recovered.

The point at which the reaction is to be terminated in order to produce a polymer having the desired ethylene content can be determined from experience obtained in other runs under a given set of conditions or it can be determined by sampling the reaction mixture and determining the ethylene content of the polymer at any given time.

The manner of terminating the reaction is conventional, e.g., by adding a polar liquid such as an alcohol to the reaction mixture. The work-up of the polymer product can be carried out in the manner which is well known for the production of polypropylene.

In an alternative method of preparation leading to product differing somewhat in its properties, the copolymerization of ethylene and propylene is carried out as the first step. The mixture is reacted with a stereospecific catalyst suitable also for the production of isotactic polypropylene until about the desired amount of copolymer has been produced. The vapor space of the reactor is then evacuated to remove unconverted monomer and the liquid reaction mixture is held at reaction conditions to assure complete conversion of any remaining monomer. Thereafter propylene is added and the reaction continued until the desired amount of total modified, specially constructed polypropylene has been produced.

In preparing the blended products of this invention it is important to effect thorough mixing of the polypropylene and modified polypropylene product in order to produce uniform blended product of the best mechanical properties. Any method capable of achieving initimate blends may be used. Blends can be prepared by blending separate slurries containing each of the two types of polymers, by blending one of the polymers in finished powder form into a slurry of the other polymer, by compounding finished polymer product of the two types, or by blending the two types of polymer as powders followed by suitable compound. Compounding comprises forming an intimate blend such as by extruding, milling on a plastic roll mill, or mixing in a Banbury mill.

A preferred method of preparing the blends comprises separately producing each of the polymer products to form slurries of polymer in their respective reaction mixtures, killing the catalyst in each of the slurries by addition of a suitable polar compound such as an acidified alcohol, and blending the two slurries, followed by conventional work-up of the resulting slurry.

In an alternative method, a finished product, preferably said modified polypropylene product, is produced in finished form as a dry powder and this is added at the desired time and in the desired proportions into the slurry containing the other polymer. This is preferably done following the catalyst killing step. The work-up of the resulting mixed slurry is again conventional.

A suitable form of producing the blends of this invention consists in producing the two polymer products separately in finished form, e.g., in the form of nibs, blending the nibs in the desired proportion, and working them together at an elevated temperature, e.g., by re-extruding them. Other compounding methods may be used for the intimate mixing of such mixtures, such as milling on a plastic roll mill or mixing in a Banbury mill. In milling and similar compounding it is important that the mixture be above the fusion temperature of polypropylene. Typical temperatures during compounding by milling, mixing or extruding are from 180 to 250° C.

The two polypropylene products may be prepared in dry unfinished form, i.e., as powders, intimately blended in this form, and thereafter converted into a uniform composition by extrusion, milling or other intimate blending. Extended periods of milling may be required to produce a uniform product when this procedure is adopted.

Conventional methods of modifying polypropylene for various commercial purposes are applicable to the polypropylene blends of this invention. This includes the use of oxidation inhibitors or heat stabilizers, ultraviolet stabilizers, flow promoting additives, slip additives, antistatic additives, pigments, fillers and the like. Selection can be made from the great variety of suitable materials of these various classes which are known to the art. The selection of an individual additive will not ordinarily be affected by the difference of the modified polypropylene blends of this invention from conventional polypropylene products. Stabilizing additives, and particularly heat stabilizers, are preferably incorporated in each of the separate blending components of the invention during the production thereof. Additives may also be added to the total blend during the final blending steps or in a separate subsequent blending step.

It is particularly advantageous to incorporate into the polypropylene blends of this invention a small amount of a crystallization modifying additive which acts as crystal nucleating agent. The addition of a small amount of such material often results in substantial further increases in the resistance of the product to impact at low temperatures. Particularly useful crystal modifying compounds for this purpose are certain carboxylic acids, their anhydrides and certain of their salts. The acids are disclosed in detail in U.S. Patents 3,207,735, 3,207,736 and 3,207,738 to Wijga, and their salts in 3,207,737, 3,207,739 and 3,268,999 to Wales. The disclosures of these patents are incorporated herein by reference. Typical effective acids are succinic, benzoic and phenylacetic acid. Typical effective salts are aluminum tert.butyl benzoate and sodium benzoate.

The presence of crystal nucleating agents in blends of this invention often accelerates the rate at which the ultimate strength of shaped products is developed. The presence of such agents also tends to result in improvement of product properties when product shaping procedures are carried out at relatively high temperatures.

The invention will be better understood from the following examples which, however, are presented only for purpose of illustrating preferred modes of the invention and the results obtainable by the invention and are not to be considered as limiting the invention.

PREPARATION OF POLYMERS

Polypropylene for use in Example 2 is prepared as a slurry by contacting propylene at a temperature of about 50° C. and a pressure of about 250 p.s.i. with a catalyst suspended in propane. Hydrogen is present in the polymerization reaction zone to control to I.V. of the polymer. The catalyst is prepared by reducing titanium tetrachloride to titanium trichloride in hydrocarbon solution by heating with about a stoichiometric amount of aluminum triethyl, adding this mixture to the reaction vessel and also adding sufficient aluminum diethyl chloride to provide an aluminum-to-titanium atomic ratio of about 3:1. The polymerization is carried out in a continuous process, the concentration of polypropylene in the slurry being about 15%. Slurry is withdrawn from the reaction zone and contacted with an alcohol and HCl to deactivate the catalyst. Unblended polypropylene is recovered from the slurry by washing the slurry in known manner with solutions such as alcoholic or aqueous solutions of HCl, drying the polypropylene and inhibiting it against oxidation by addition of a suitable combination of additives. The polypropylene has an intrinsic viscosity of 2.4; insolubility in isooctane is 98%. Polypropylene for use in Examples 1 and 3–6 is similarly prepared, using the same type of catalyst.

The impact resistance of such polypropylene can be substantially improved according to this invention, as shown in the examples.

Specially modified polypropylene for blending is typically prepared as follows:

In a 2.5 gallon agitated pressure vessel there is placed a mixture of 6 liters heptane, 24 mmols (millimoles) titanium trichloride and 84 mmols of aluminum diethyl chloride. The titanium trichloride used is suitably prepared either by reduction of titanium tetrachloride by means of aluminum metal or by reduction of titanium tetrachloride by means of aluminum triethyl. To the reaction vessel there is added from 800 to 1500 ml. of hydrogen, depending on the I.V. which is desired for the final product. For the sake of a specific illustration, 1500 ml. of hydrogen is added, measured at atmospheric temperature and pressure. The autoclave is closed and heated to a temperature of 60° C. Propylene is then rapidly added, at the rate of 100 grams per minute, until the pressure in the reaction vessel is 45 p.s.i. About 300 grams of propylene is thus added. Thereafter the rate of propylene addition is decreased to 10 grams per minute, which maintains this pressure. When 700 grams of propylene has been added the rate of propylene addition is decreased to 5 grams per minute and ethylene addition is commenced at the rate of about 5 grams per minute. Both propylene and ethylene addition are discontinued 15 minutes thereafter. The total amount of propylene thus added is 775 grams and the amount of ethylene added is 80 grams. Agitation is continued for a brief period until the gas pressure begins to drop below 45 p.s.i. The catalyst present in the reaction mixture is then killed by adding 50 ml. of 10% HCl in 6 liters isopropyl alcohol. Polymer is removed from the reaction slurry by filtration and is washed to free it of catalyst residue.

The recovered modified polypropylene, as used in preparing the blend of Example 2, has the following properties:

| | |
|---|---|
| Ethylene content, percent weight | 5.6 |
| Intrinsic viscosity, dl./g. | 1.8 |
| Yield strength, p.s.i., measured at 0.2 in./min. | 2650 |
| Elongation at yield, percent | ---- |
| Tensile modulus, p.s.i. | ---- |
| Impact strength, notched Izod, ft. lb./in.: | |
| 23° C. | No break |
| 0° C. | 2.07 |
| Hardness, Rockwell M | −8 |

Examples 1–3

To 100 parts by weight of polypropylene prepared as described above and having an I.V. of 2.4 was added 61 parts of specially modified polypropylene prepared as described above, having an I.V. of 1.8 and containing 5.6% by weight ethylene. Both polymers were in the form of dry powder. The powders were mixed by tumbling action for 24 hours. The mixed powder was then worked on a hot (190° C.) plastics mill for 10 minutes. Physical properties of the blend made in this manner are given in Table 1 as Example 2. Blends for Examples 1 and 3 were similarly prepared.

Examples 4–5

To a slurry of 34 parts of specially modified polypropylene (I.V. 2.6; ethylene content 9.6% wt.) in about 320 parts of heptane was added 100 parts of polypropylene (I.V. 2.3). The slurry was stirred for one hour and the heptane removed by vacuum distillation while the mixture was stirred vigorously. The resulting blend was used directly for preparation of compression molded test pieces. Physical properties of the blend are given in Example 5 of Table 1. A blend for Example 4 was similarly prepared.

Example 6

A powder blend of polypropylene and modified polypropylene was prepared as in Examples 1–3. The powder blend was then extruded from a Harttig Plastics Extruder. Physical properties of the resulting extruded product are given in Example 6 of Table 1.

TABLE 2

| Example | Percent wt. Ethylene in Modified Polymer | PHP Modified Polymer in Polypropylene | Properties of Blends | | | | |
|---|---|---|---|---|---|---|---|
| | | | Percent wt. Ethylene | I.V., dl./g. | Tensile Yield, 0.2"/min., p.s.i. | Izod Impact at— | |
| | | | | | | 23° C. | 0° C. |
| 1 | 3.9 | 129 | 2.1 | 2.3 | 3,890 | 1.5 | 0.69 |
| 2 | 5.6 | 61 | 2.4 | 2.2 | 3,730 | 1.5 | 0.76 |
| 3 | 9.4 | 30 | 2.1 | 2.3 | 3,630 | 1.7 | 0.79 |
| 4 | 7.8 | 52 | 2.7 | 2.9 | 3,370 | H 9.5 | 1.23 |
| 5 | 9.6 | 34 | 2.4 | 2.4 | 3,550 | 2.02 | 0.69 |
| 6 | 9.1 | 32 | 2.2 | 4.2 | 3,550 | H 6.7 | 1.58 |

H=Hinged Break.

Since the products blended with polypropylene according to this invention consist essentially of polypropylene having a small amount of ethylene contained therein, they are generally referred to herein as "modified polypropylene," or "modified polypropylene product." Having reference to the fact that ethylene is incorporated in polypropylene in accordance with this invention in a novel and unusual chemical structure, the product may also be referred to as "modified, specially structured polypropylene product." These modified polypropylene products are suitably prepared by the method of my copending application Ser. No. 511,528, now Patent 3,318,976.

I claim:

1. A composition which consists essentially of 1 part by weight of isotactic polypropylene having blended therewith from 0.1 to 10 parts by weight of a modified polypropylene product consisting to the extent of at least about 50% by weight of isotactic polypropylene polymer chains, having ethylene-propylene copolymer attached to one end of at least a portion of said polypropylene chains, the total amount of ethylene units in said modified polypropylene product being in the range from 2 to 25% by weight and the total amount of ethylene units in said composition being in the range from 1 to 22% by weight.

2. The method for increasing the low temperature impact resistance of isotactic polypropylene while retaining a high tensile strength which comprises intimately mixing one part of isotactic polypropylene with from 0.1 to 10 parts by weight of a modified polypropylene product consisting to the extent of at least about 50% by weight of isotactic polypropylene polymer chains, having ethylene-propylene copolymer attached to one end of at least a portion of said polypropylene chains, the total of ethylene units in said modified polypropylene product being in the range from 2 to 25% by weight and the total amount of ethylene units in the resulting mixture being in the range from 1 to 22% by weight, and intimately blending the mixture above the fusion temperature of polypropylene.

3. A composition which consists essentially of 1 part by weight of isotactic polypropylene having blended therewith from 0.25 to 1 part by weight of a modified polypropylene product consisting to the extent of at least about 50% by weight of highly isotactic polypropylene polymer chain uninterrupted by ethylene and having ethylene-propylene copolymer attached to one end of at least a portion of said polypropylene chains, the total amount of ethylene units in said modified polypropylene product being in the range from 2 to 20% by weight and the total amount of ethylene units in said composition being in the range from 1 to 8% by weight.

4. The method for increasing the low temperature impact resistance of isotactic polypropylene while retaining a high tensile strength which comprises intimately mixing one part of isotactic polypropylene with from 0.25 to 1 part by weight of a modified polypropylene product consisting to the extent of at least about 50% by weight of highly isotactic polypropylene polymer chains uninterrupted by ethylene, having ethylene-propylene copolymer attached to one end of at least a portion of said polypropylene chains, the total amount of ethylene units in said modified polypropylene product being in the range from 2 to 20% by weight and the total amount of ethylene units in the resulting mixture being in the range from 1 to 8% by weight, and intimately blending the mixture above the fusion temperature of polypropylene.

References Cited

FOREIGN PATENTS 599,410   7/1961   Belgium.

SAMUEL H. BLECH, *Primary Examiner.*

D. J. BREZNER, *Assistant Examiner.*